(12) United States Patent
Villena

(10) Patent No.: US 9,227,597 B1
(45) Date of Patent: Jan. 5, 2016

(54) WIPER BLADE FOR WIPING A SURFACE OF A WINDSHIELD

(71) Applicant: GM GLOBAL TECHNOLOGY OPERATIONS LLC, Detroit, MI (US)

(72) Inventor: Eduardo C. Villena, Sao Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 14/310,574

(22) Filed: Jun. 20, 2014

(51) Int. Cl.
*B60J 1/02* (2006.01)
*B60S 1/38* (2006.01)
*B60J 1/00* (2006.01)

(52) U.S. Cl.
CPC .. *B60S 1/38* (2013.01); *B60J 1/002* (2013.01); *B60S 2001/3836* (2013.01)

(58) Field of Classification Search
CPC ...... B60S 1/38; B60S 2001/3836; B60J 1/002
See application file for complete search history.

(56) References Cited

U.S. PATENT DOCUMENTS

| 4,378,484 A * | 3/1983 | Kunert | B32B 17/10036 15/250.001 |
| 8,499,407 B2 * | 8/2013 | Caillot | B60S 1/3805 134/45 |
| 2003/0028990 A1 * | 2/2003 | Zimmer | B60S 1/32 15/250.201 |

* cited by examiner

*Primary Examiner* — Lori L Lyjak
(74) *Attorney, Agent, or Firm* — Quinn Law Group, PLLC

(57) ABSTRACT

A vehicle includes a windshield and a wiper assembly. The windshield presents a surface. The wiper assembly includes an arm and a wiper blade. The arm is movably attached to the vehicle. The wiper blade is operatively attached to the arm. The wiper blade includes a wiping member. The wiping member defines a longitudinal axis and extends between a first end and a second end. The wiping member has a plurality of radially extending protrusions that circumferentially surround the longitudinal axis such that the wiping member has a generally polygonal shaped cross-section. At least one of the protrusions is configured to maintain wiping contact relationship with the surface of the windshield as the arm moves the wiper blade to wipe the surface of the windshield.

20 Claims, 2 Drawing Sheets

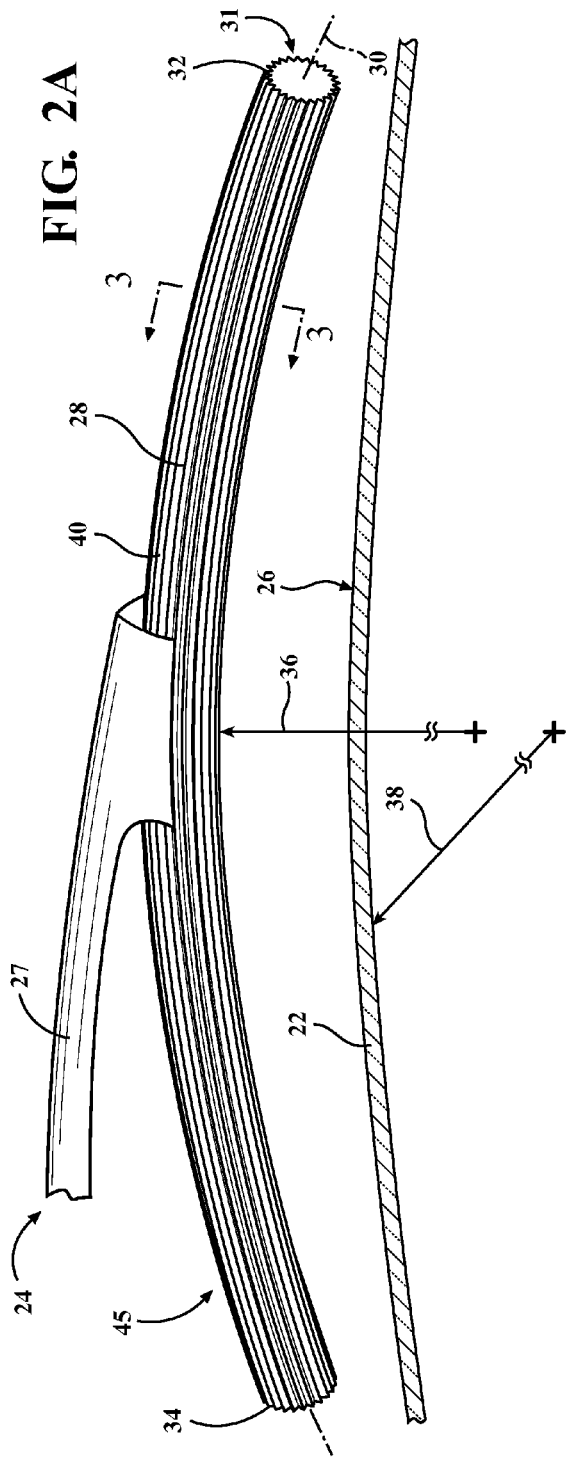
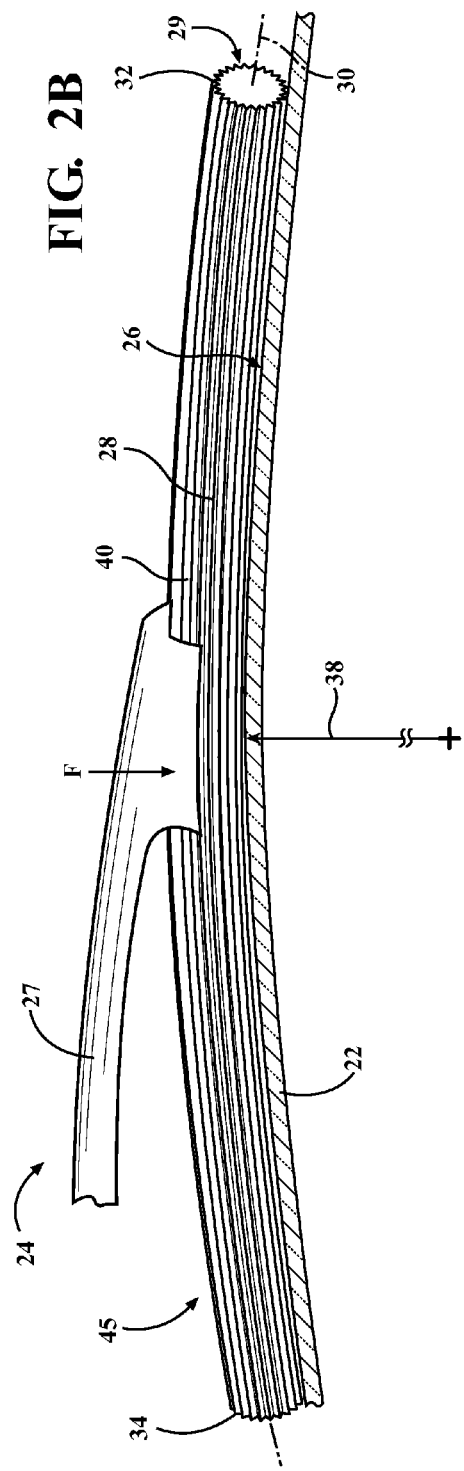

US 9,227,597 B1

WIPER BLADE FOR WIPING A SURFACE OF A WINDSHIELD

TECHNICAL FIELD

The present disclosure is related to a wiper blade for wiping a surface of a windshield.

BACKGROUND

Windshield wiper assemblies or windshield wipers are typically used on vehicle and aircraft windshields in order to improve operator and passenger visibility in wet or inclement weather. Windshield wipers usually include a wiper arm that is connected on one end to a vertical wiper post, and connected on the other end to an articulated section, which in turn connects to a blade section that is shaped or configured to retain a relatively soft rubber blade or sweep, which is the only portion of the wiper assembly that contacts the windshield surface.

SUMMARY

One possible aspect of the disclosure provides a wiper blade for wiping a surface of a windshield of a vehicle. The wiper blade includes a wiping member. The wiping member defines a longitudinal axis and extends between a first end and a second end. The wiping member has a plurality of radially extending protrusions circumferentially surrounding the longitudinal axis such that the wiping member has a polygonal shaped cross-section. At least one of the protrusions is configured to maintain wiping contact relationship with the surface of the windshield as the wiper blade wipes the surface of the windshield.

Another aspect of the disclosure provides a wiper assembly for wiping a surface of a windshield of a vehicle. The wiper assembly includes an arm and a wiper blade. The arm is configured to be movably attached to the vehicle. The wiper blade is operatively attached to the arm. The wiping member defines a longitudinal axis and extends between a first end and a second end. The wiping member has a plurality of radially extending protrusions circumferentially surrounding the longitudinal axis such that the wiping member has a generally polygonal shaped cross-section. At least one of the protrusions is configured to maintain a wiping contact relationship with the surface of the windshield as the arm moves the wiper blade to wipe the surface of the windshield.

Yet another aspect of the disclosure provides a vehicle that includes a windshield and a wiper assembly. The windshield presents a surface. The wiper assembly includes an arm and a wiper blade. The arm is movably attached to the vehicle. The wiper blade is operatively attached to the arm. The wiper blade includes a wiping member. The wiping member defines a longitudinal axis and extends between a first end and a second end. The wiping member has a plurality of radially extending protrusions that circumferentially surround the longitudinal axis such that the wiping member has a generally polygonal shaped cross-section. At least one of the protrusions is configured to maintain wiping contact relationship with the surface of the windshield as the arm moves the wiper blade to wipe the surface of the windshield.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 2A is a schematic perspective side view of a windshield wiper assembly of FIG. 1 that is not in wiping contact relationship with the surface of the windshield.

FIG. 2B is a schematic perspective side view of the windshield wiper assembly of FIG. 1 that is in wiping contact relationship with the surface of the windshield.

DETAILED DESCRIPTION

Figure 1:
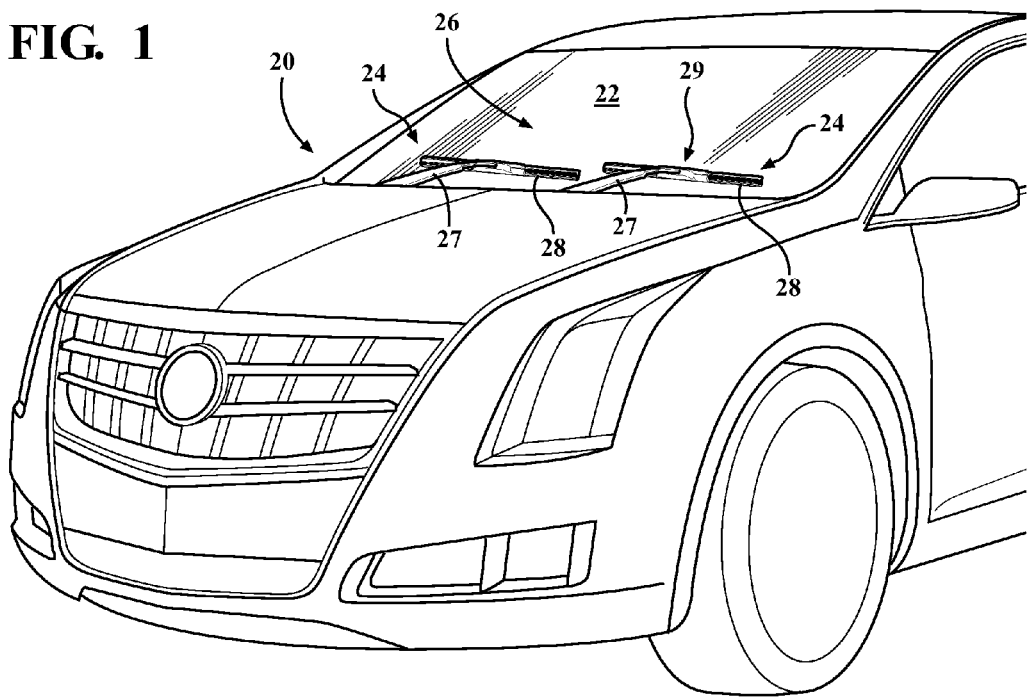
FIG. 1 is a schematic partial perspective view of a vehicle having a pair of windshield wiper assemblies for wiping a surface of a windshield.

Referring to the drawings, wherein like reference numbers refer to like components throughout the several Figures, a vehicle is shown at 20 in FIG. 1. The vehicle 20 includes a windshield 22 and a pair of wiper assemblies 24. Each wiper assembly 24 is configured to be operatively disposed in wiping contact relationship 29 to a surface 26 of the windshield 22 to sweep across the surface 26 to remove water, snow, or other visual obstructions, resident on the windshield 22, from the field of view of an operator and/or passenger of the vehicle 20.

The wiper assembly 24 is shown in FIG. 1 as having a tandem arrangement, wherein the term "tandem" refers to a configuration of two wiper assemblies 24. However, it should be appreciated that any number of wiper assemblies 24 may be used on a given windshield 22. Further, it should be appreciated that the wiper assemblies 24 are not limited to sweeping across a windshield 22, but may also sweep across any other pane of glass or panel, such as a back window, headlights, and the like.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring now to FIGS. 2A and 2B, each wiper assembly 24 includes a wiper arm 27 and a wiper blade 28. The wiper blade 28 is operatively attachable to the wiper arm 27. The wiper blade 28 is configured to wipe the surface 26 of the windshield 22 when the wiper assembly 24 is disposed in wiping relationship to the windshield 22, as described in more detail below. The wiper assemblies 24 may be controllable by the operator of the vehicle 20 or in response to the vehicle 20 sensing the surface 26 requires clearing. The wiper assembly 24 may include a power source or an electric motor (not shown), which is drivably and continuously connected with a mechanical linkage (not shown). The wiper arm 27 is configured to operatively interconnect the wiper assembly 24 and the electric motor. The electric motor selectively operates to move the wiper arm 27, via the mechanical linkage, in an alternating and sweeping manner, with respect to the surface 26 of the windshield 22.

The wiper blade 28 is configured to sweep the surface 26 of the windshield 22 as the wiper assembly 24 moves. The wiper blade 28 defines a longitudinal axis 30 and extends between a first end 32 and a second end 34. Referring to FIG. 2A, when the wiper blade 28 is not in wiping contact relationship 31 with the surface 26 of the windshield 22, the longitudinal axis 30 may be curved, where the curvature has an initial radius of curvature 36. The windshield 22 may be generally planar or have a curvature with a secondary radius of curvature 38 that is greater than the initial radius of curvature 36. The wiper blade 28 may be attached to the wiper arm 27 at a location between the first end 32 and the second end 34. When the wiper blade 28 is placed into contact with the surface 26 of the windshield 22, the wiper arm 27 applies a force F to the wiper arm 27 at the location between the first end 32 and the second end 34, in the direction of the surface 26 of the windshield 22. Due to the initial radius of curvature 36 of the wiper blade 28 being less than the secondary radius of curvature 38 of the windshield 22, when the wiper blade 28 is moved toward the surface 26, the first end 32 and the second end 34 are configured to initially contact the surface 26. As the force F is continually applied to the wiper blade 28 by the wiper arm 27, in the direction of the surface 26 of the windshield 22, a flexible rigidity of the wiper blade 28 allows the first end 32 and the second end 34 to move away from one another until the entire wiper blade 28 is in wiping contact relationship 29 with the surface 26 of the windshield 22 and the initial radius of curvature 36 of the wiper blade 28 becomes generally equal to the secondary radius of curvature 38 of the surface 26 of the windshield 22, if the windshield 22 is curved, or otherwise becomes generally planar if the windshield 22 is planar, as shown in FIG. 2B. As such, the continued application of force F to the wiper blade 28 causes the wiper blade 28 to become in wiping contact relationship 29 with, i.e., conform to, the surface 26 of the windshield 22 between the first end 32 and the second end 34.

As previously discussed, the wiper blade 28 may be flexibly rigid. The flexible rigidity of the wiper blade 28 allows the wiper blade 28 to automatically return to the initial radius of curvature 36 when the wiper blade 28 is moved from being in wiping contact relationship 29 with the surface 26, as shown in FIG. 2B, to not be in wiping contact relationship 31, as shown in FIG. 2A, as described above. Further, the flexible rigidity of the wiper blade 28 allows the wiper blade 28 to automatically conform to the curvature of the surface 26 of the windshield 22 when the wiper blade 28 is in wiping contact relationship 29 with the surface 26 of the windshield 22, as shown in FIG. 2B.

Figure 3:
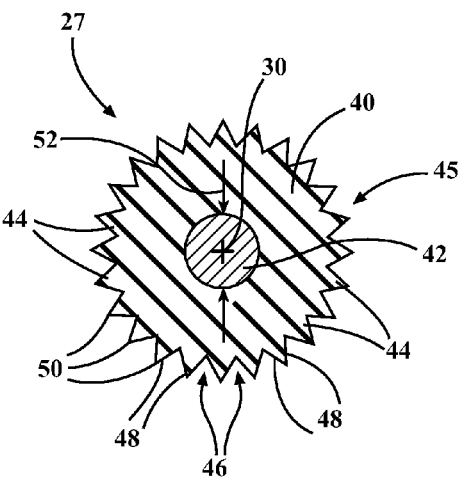
FIG. 3 is a schematic cross-sectional side view of the wiper blade having a striated profiled, taken along line 3-3 of FIG. 2A.

Referring to FIG. 3, as viewed in cross-section, the wiper blade 28 includes a wiping member 40 and a core 42. The wiping member 40 is generally circular and has a plurality of radially extending protrusions 44 that surround the longitudinal axis 30 such that the wiping member 40 has a generally polygonal shaped cross-section. More specifically, the protrusions 44 surround the longitudinal axis 30 such that the wiping member 40 has a regular, complex polygon. By way of a non-limiting example, the protrusions 44 may be triangular such that the wiping member has a generally star-polygonal shaped cross-section. The term "star-polygonal" refers to a self-intersecting, equilateral equiangular polygon, created by connecting one vertex 50 of a simple, regular, p-sided polygon to another, non-adjacent vertex 50 and continuing the process until the original vertex 50 is reached again. Each protrusion 44 longitudinally extends between the first end 32 and the second end 34 to present a striated profile 45. The term "striated" refers to grooves 46 that are defined between each protrusion 44, where the grooves 46 longitudinally extend along the wiping member 40, between the ends 32, 34, in spaced and generally parallel relationship to one another. At least one of the protrusions 44 is configured to maintain contact with the surface 26 of the windshield 22 when the wiper assembly 24 is disposed in wiping relationship to the windshield 22.

With continued reference to FIG. 3, each protrusion 44 is formed between a pair of radially extending walls 48 that intersect at a vertex 50. The intersecting walls 48 form the triangular shaped protrusion 44 therebetween. As such, the vertices 50 extend in spaced relationship and generally parallel relationship to the longitudinal axis 30 while extending longitudinally between the first end 32 and the second end 34. Further, the vertices 50 extend longitudinally between the first end 32 and the second end 34, in spaced relationship to one another. The protrusions 44 define the grooves 46 therebetween. The grooves 46 may be generally v-shaped. Therefore, the grooves 46 and the protrusions 44 circumferentially surround the longitudinal axis 30 in alternating relationship to one another. The vertex 50 of at least one of the protrusions 44 is configured to contact the surface 26 of the windshield 22 when the wiper blade 28 is in wiping relationship to the surface 26 of the windshield 22. While the grooves 46 are shown as having a generally v-shape, it should be appreciated that the grooves 46 may have other shapes, as desired.

The protrusions 44 may be configured to be generally equal to one another in side. Likewise, the grooves 46 may be configured to be of equal size. Further, the wiping member 40 may have any number of protrusions 44 and grooves 46. The conformity of the sizes of the protrusions 44 and the grooves 46 may allow the wiper blade 28 to be circumferentially attached to the wiper arm 27. This type of attachment may allow the wiper blade 28 to be rotated about the longitudinal axis 30, relative to the wiper arm 27, when one or more protrusion 44 wears out from wiping the surface 26 of the windshield 22, thus extending a usable life of the wiper blade 28.

The wiping member 40 is sufficiently flexible such that the protrusions 44 also conform to the surface 26 of the windshield 22 to maintain wiping contact relationship 29 therewith. The wiping member 40 may include an elastomer such as a synthetic rubber or rubber-like material, including but not limited to, ethylene-propylene terpolymer (EPDM), neoprene (polychloroprene), styrenebutadiene rubber, nitrile rubbers or silicone rubbers. In one non-limiting example, the wiping member 40 includes polychloroprene rubber having a hardness of between 60 and 70 International Rubber Hardness Degrees (IRHD). More preferably, the wiping member 40 has a hardness of 65 IRHD.

The core 42 extends longitudinally along the longitudinal axis 30 between the first end 32 and the second end 34. With continued reference to FIG. 3, the core 42 has a generally circular cross-section having a diameter 52. The core 42 may be shaped to have the diameter 52 by any desired method, for example by drawing. In one non-limiting example, the core 42 includes one or more metals, such as steel. The steel may have be carbon steel having a density of approximately 0.00785 grams per cubic millimeters (g/mm^3). More preferably, the steel may be high carbon steel, having between 0.6-0.99% carbon content.

With continued reference to FIG. 3, the wiping member 40 radially surrounds the core 42. The core 42 is configured to provide structural support and rigidity to the wiper blade 28, i.e., flexibly rigid. The core 42 may be curved between the first end 32 and the second end 34 such that the longitudinal axis 30 of the wiper blade 28 has the curvature, as described above. The curvature of the core 42 is configured to continually bias the wiping member 40 into wiping contact relationship 29 with the surface 26 of the windshield 22 such that at least one protrusion 44 maintains contact with the surface 26 of the windshield 22.

The wiper blade 27 may be formed by co-extruding the wiping member 40 with the core 42. It should be appreciated that the wiping member 40 and the core 42 may be attached to one another using other methods, as known to those of skill in the art.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A wiper blade for wiping a surface of a windshield of a vehicle, the wiper blade comprising:
   a wiping member defining a longitudinal axis and extending between a first end and a second end;
   wherein the wiping member includes a plurality of radially extending protrusions circumferentially surrounding the longitudinal axis such that the wiping member has a polygonal shaped cross-section; and
   wherein at least one of the protrusions is configured to maintain wiping contact relationship with the surface of the windshield as the wiper blade wipes the surface of the windshield.

2. A wiper blade, as set forth in claim 1, wherein the protrusions are further defined as circumferentially surrounding the longitudinal axis such that the wiping member has a star-polygonal shaped cross-section.

3. A wiper blade, as set forth in claim 2, wherein each protrusion extends longitudinally between the first end and the second end.

4. A wiper blade, as set forth in claim 2, wherein the protrusions are triangular shaped in cross-section.

5. A wiper blade, as set forth in claim 4, wherein each protrusion is formed between a pair of radially extending walls to intersect at a vertex.

6. A wiper blade, as set forth in claim 5, wherein the vertex of each protrusion extends longitudinally between the first end and the second end in spaced relationship to the longitudinal axis; and
   wherein the vertices extend longitudinally between the first end and the second end in spaced relationship to one another.

7. A wiper blade, as set forth in claim 2, wherein the protrusion are flexibly rigid such that the at least one protrusion is configured to conform and maintain wiping contact relationship with the surface as the wiper blade wipes the surface of the windshield.

8. A wiper blade, as set forth in claim 7, wherein the wiping member comprises an elastomeric material.

9. A wiper blade, as set forth in claim 2, further comprising a core extending longitudinally along the longitudinal axis between the first end and the second end;
   wherein the wiping member radially surrounds the core.

10. A wiper blade, as set forth in claim 8, wherein the core has a generally round cross-section.

11. A wiper blade, as set forth in claim 8, wherein the core comprises steel.

12. A wiper assembly for wiping a surface of a windshield of a vehicle, the wiper assembly comprising:
   an arm configured to be movably attached to the vehicle;
   a wiper blade operatively attached to the arm, wherein the wiper blade includes:
      a wiping member defining a longitudinal axis and extending between a first end and a second end;
      wherein the wiping member has a plurality of radially extending protrusions circumferentially surrounding the longitudinal axis such that the wiping member has a polygonal shaped cross-section; and
      wherein at least one of the protrusions is configured to maintain wiping contact relationship with the surface of the windshield as the arm moves the wiper blade to wipe the surface of the windshield.

13. A wiper assembly, as set forth in claim 12, wherein the protrusions are further defined as circumferentially surrounding the longitudinal axis such that the wiping member has a star-polygonal shaped cross-section.

14. A wiper assembly, as set forth in claim 13, wherein each protrusion extends longitudinally between the first end and the second end.

15. A wiper assembly, as set forth in claim 13, wherein the protrusions are triangular shaped in cross-section.

16. A wiper assembly, as set forth in claim 15, wherein each protrusion is formed between a pair of radially extending walls to intersect at a vertex.

17. A wiper assembly, as set forth in claim 16, wherein the vertex of each protrusion extends longitudinally between the first end and the second end in spaced relationship to the longitudinal axis; and
   wherein the vertices extend longitudinally between the first end and the second end in spaced relationship to one another.

18. A wiper assembly, as set forth in claim 12, wherein the protrusions are flexibly rigid such that the at least one protrusion is configured to conform and maintain wiping contact relationship with the surface as the wiper blade wipes the surface of the windshield.

19. A wiper assembly, as set forth in claim 12, further comprising a core extending longitudinally along the longitudinal axis between the first end and the second end;
   wherein the wiping member radially surrounds the core.

20. A vehicle comprising:
   a windshield presenting a surface; and
   a wiper assembly, wherein the wiper assembly includes:
      an arm movably attached to the vehicle; and
      a wiper blade operatively attached to the arm, wherein the wiper blade includes:
         a wiping member defining a longitudinal axis and extending between a first end and a second end;
         wherein the wiping member has a plurality of radially extending protrusions circumferentially surrounding the longitudinal axis such that the wiping member has a generally polygonal shaped cross-section; and
         wherein at least one of the protrusions is configured to maintain wiping contact relationship with the surface of the windshield as the arm moves the wiper blade to wipe the surface of the windshield.

* * * * *